Patented Aug. 24, 1954

2,687,393

UNITED STATES PATENT OFFICE 2,687,393

SYNTHETIC FIBER PREPARATION

Quirino A. Trementozzi and George E. Ham, Dayton, Ohio, assignors to Monsanto Chemical Company, St. Louis, Mo., a corporation of Delaware No Drawing. Application January 26, 1951,
Serial No. 208,086

9 Claims. (Cl. 260—32.6)

This invention relates to new methods of preparing synthetic fibers from acrylonitrile polymers. More particularly, the invention relates to completely miscible mixtures of polymeric compositions containing both acrylonitrile and vinylpyridine in polymeric form, from which mixtures it is possible to prepare high tenacity fibers by extrusion methods.

It is well-known that polyacrylonitrile and copolymers of 80 per cent or more of acrylonitrile and up to 20 per cent of other monomeric substances have excellent fiber-forming properties. The conventional technique for preparing some of these acrylonitrile polymers involves the dissolution of the polymer in a suitable solvent and thereafter extruding the solution through an orifice, or spinnerets containing a plurality of orifices, into a medium which removes the solvent from the solution and precipitates the polymer in a continuous fiber. Although many solvents have been proposed for dissolving acrylonitrile polymers, the use of most of them is impracticable by reason of the cost of the solvent, the difficulty of removing the solvent from the fiber for reuse, or the disadvantageous viscosity characteristics of the resulting solutions.

The primary purpose of this invention is to provide a new solvent which is unusually effective in dissolving certain classes of acrylonitrile polymers. Another purpose of the present invention is to provide an improved method for preparing high tenacity fibers from certain classes of acrylonitrile polymers. A still further purpose of this invention is to provide new fiber extrusion methods.

It has been found that N,N-dimethylproprionamide, which has heretofore been regarded as a non-solvent, is an effective solvent for certain classes of acrylonitrile polymers. This solvent is effective for use in fiber-spinning procedures involving the use of polymers of which from 80 to 92 per cent by weight of the total polymerized monomers is acrylonitrile. One or more other monomers will be present in the copolymer which may be the conventional monomers well-known to be copolymerizable with acrylonitrile, or it may be an N-cyclic compound containing a heterocyclic nucleus and a polymerizable radical on a side chain. N-cyclic compounds are those having imidazole, benzimidazole, imidazoline, oxazole, benzoxazole, thiazole, benzothiazole, pyridazine, pyrimidine, pyrazine, pyrazole, thiazine, quinoline, and pyridine nuclei and side chains on either carbon or nitrogen atoms as follows, the alkyl groups such as allyl, methallyl, isopropenyl and vinyl, the alkenyl oxyalkyls, the alkyl acrylates and methacrylates. Examples of monomers of these types are 2-vinylpyridine, 2-ethyl-5-vinylpyridine and many others as described in copending application, Serial No. 206,916, filed January 19, 1951, by George E. Ham and Alfred B. Craig and entitled Fiber-Forming Polymers.

The acrylonitrile polymers for use in the practice of this invention may be copolymers of 80 per cent to 92 per cent of acrylonitrile and from eight per cent to twenty per cent of vinylpyridine which may be used in unmodified form to prepare dyeable fibers of good tenacity. However, the copolymers of 88 per cent to 92 per cent of acrylonitrile and from eight per cent to 12 per cent of vinylpyridine will have preferred properties of good dyeability and high fiber strength. The acrylonitrile copolymers may be polymers of three or more monomers, for example the copolymers of from 80 per cent to 92 per cent of acrylonitrile, from two per cent to 20 per cent of vinylpyridine, and up to 18 per cent of other monomers copolymerizable therewith, for example styrene, vinyl chloride, α-methylstyrene, vinylidene chloride, vinyl acetate and particularly methacrylonitrile.

The acrylonitrile polymers useful in the practice of this invention may be a blend of two polymers, one a copolymer of 80 per cent to 92 per cent acrylonitrile and the other, used in minor proportions a copolymer of vinylpyridine. In these blended polymers the vinylpyridine polymer may be a polymer of from 30 per cent to 100 per cent vinylpyridine and will be added to the fiber-forming acrylonitrile polymer in such proportions as to provide from two per cent to ten per cent of vinylpyridine in the resultant blend. The blended polymers have the advantage of being more heat stable than the straight copolymers of the same proportions of monomers.

It has been found that the polymers of desirable physical properties are those which are prepared by the aqueous suspension technique wherein the monomers or mixtures of monomers are added to an aqueous medium maintained under conditions suitable for a rapid but controlled polymerization. The aqueous medium should contain a water-soluble peroxy catalyst and a dispersing agent which induces the precipitation of a finely divided polymer. In order to insure the optimum concentration of peroxy catalyst and dispersing it is frequently more desirable to add these reagents continuously or intermittently through the reaction. A preferred practice involves the charging of the monomers or mixtures of monomers gradually during the course of the reaction at a uniform rate or at a varying rate which permits the maintenance of the reaction at a constant temperature, for example, the reflux temperature. If desired, a "redox" polymerization using sodium bisulfite, sulfur dioxide, or other sulfur compounds having the sulfur in an oxidizable state may be employed.

In the practice of this invention, as in the preparation of acrylonitrile fibers by prior art methods, the physical properties of the polymers are of primary importance. It is desirable that the polymers be uniform with respect to molecular weight, particle size, and chemical composition. Accordingly, the methods for their preparation must be selected so as to induce the uniformity of chemical and physical properties. In general, the molecular weight should be in excess of 10,000 and preferably in excess of 25,000, the molecular weights being determined by measuring the viscosity of dilute solutions in the manner well-known to the art.

In the practice of this invention the polymers of acrylonitrile are used in finely divided form. Although massive polymers may be ground to desirable size the selection of a suspension polymerization procedure in accordance with the above principles will produce the desired subdivided state directly without resort to separate comminution procedures. The polymer solutions are prepared by dispersing the finely divided polymers in the N,N-dimethylpropionamide at temperatures between ten and 30° C. Under these conditions the polymer is not soluble and will form a free-flowing liquid suspension. After thoroughly mixing the solid polymer with the N,N-dimethylpropionamide to insure thorough wetting of the solid, the temperature is increased to between 50° C. and 150° C., and relatively rapid dissolution takes place. Prolonged heating and agitation, for example, by tumbling are usually not necessary to induce the formation of completely homogeneous solutions.

It is desirable to use a solution of as high a concentration as possible, but the maximum concentration is dependent upon the molecular weight of the polymer and the viscosity characteristics of the polymer-solvent mixture. To obtain fibers of optimum physical properties polymers of molecular weights in excess of 25,000 are used, and with such polymers, it is only possible to dissolve a relatively small proportion in the N,N-dimethylpropionamide without exceeding practical viscosity values. Although as little as five per cent of polymer can be used in the spinning solution, such low concentrations are undesirable because they necessitate the removal of too much solvent from the extruded solution, thereby increasing solvent recovery cost as well as reducing spinning speed and lengthening the period required for coagulation. The concentration of polymer in the spinning solution is usually between eight and 25 per cent, but higher concentrations are practicable. The concentration of the polymer will ultimately be determined by considering the desired physical properties of the fiber and the speed of spinning, the latter depending upon the concentration and viscosity of the spinning solution. The viscosity will depend upon the chemical composition and molecular weight of the polymer, and the optimum concentration can best be determined by selecting a uniform high molecular weight polymer having good fibre-forming properties, and dissolving a given amount in as little of the N,N-dimethylpropionamide as possible to form a viscous solution capable of being spun at convenient temperatures.

The fibers are spun by extruding the polymer solution through an orifice or a spinneret having a plurality of orifices into a medium which removes the N,N-dimethylpropionamide. The rate of flow of the solution through the spinneret must be constant in order to produce a fiber of a uniform size. This is best achieved by using a positively driven gear pump adapted to deliver a constant flow of solution regardless of minor changes in viscosity and the variable resistance offered by the spinneret. It is also desirable to pass the solution which has been pre-filtered, through one or more additional filters before the spinneret to remove the last traces of foreign matter and particles of incompletely dissolved polymer. The polymers may be delivered to the gear pump by pressures applied by an inert gas to the solution reservoir, which is heated if necessary to make the solution fluid enough to pass through the conduits. The extruding operation should be operated at elevated temperatures, but well below the boiling point of the solvent to facilitate the handling of the apparatus.

The medium into which the solution is extruded and which removes the solvent may be either liquid or gaseous. The method involving the use of liquids, known as "wet spinning," usually utilizes water, alcohol, salt solutions, or any liquid which is a solvent for the N,N-dimethylpropionamide, but in which the copolymer is insoluble. The N,N-dimethylpropionamide is leached out of the stream of polymer solution which becomes a viscous stream and finally a solid filament. When a spinneret with a plurality of apertures is used the several streams of polymer converge to form a single strand. The spin bath must necessarily be of sufficient size to permit the complete, or substantially complete, removal of the N,N-dimethylpropionamide. Obviously, the rapidity of extrusion will also affect the size of the spin bath, high speeds requiring longer baths. The temperature of the bath also affects the size, higher temperatures permitting more rapid diffusion of the N,N-dimethylpropionamide out of the fiber and thereby permitting the use of shorter baths. It has been found that higher spinning speeds produce harsh fibers, whereas lower spinning speeds produce fibers of more desirable texture. The rough fibers can be improved if the fiber is extruded into mixtures of water and solvent which serve to reduce the rapidity of extraction of the solvent from the precipitating fiber. Obviously, if the rate of extraction is reduced longer spinning baths and additional washing procedures will be required to reduce the solvent content to the desired minimum.

Frequently production speeds require longer baths than are industrially practicable. Under such conditions spinning into a gaseous medium is preferred. In the practice of this method air, steam, nitrogen, or other gas, or mixtures of gases, which are inert at spin temperatures may be used as the medium. This method operates at higher temperatures and the N,N-dimethylpropionamide is evaporated from the surface of the fiber. The maximum temperatures to which the fiber can be subjected is about the boiling point of the N,N-dimethylpropionamide, since evaporation within the fiber body causes the formation of bubbles inside the fiber, which is usually undesirable. The fiber may be heated by convection from the hot gaseous medium or by radiation from the walls of the confining vessel. Generally, a combination of both convection and radiation is involved. The use of radiation heating is more efficient and permits operation with the wall temperature considerably in excess of the boiling point of the N,N-dimethylpropionamide. The evaporation of the N,N-dimethylpropionamide from the surface of the fiber and the speed of the fiber prevents the filament from obtaining a temperature appreciably in excess of the boiling point of the said N,N-dimethylpropionamide. The method of spinning into a gaseous medium, known as "dry spinning," is particularly adapted to high rates of extrusion. Dry spinning also minimizes the cost of solvent recovery, since separation from the air stream by cooling is possible. A vacuum may be applied in the spin cell in order to accelerate the evaporation of the relatively high boiling N,N-dimethylpropionamide. By accurate temperature control bubble formation within the fiber can be avoided.

In general, the methods of both wet and dry spinning which are commercially in use are readily adaptable to spinning solutions of polymers in N,N-dimethylpropionamide. Similarly, conventional automatic machinery for spinning continuously, drying the thread if necessary, and winding it upon suitable spools can be used. As in the case of most synthetic fibers the polymers of acrylonitrile, which are spun from N,N-dimethylpropionamide solutions must be oriented by stretching to develop optimum physical properties. If desired, part of this stretching may be accomplished in the spin bath by drawing the fiber out of the bath more rapidly than the rate of extrusion.

The practice of this invention involves other advantages over the prior art use of N,N-dimethylformamide, especially with respect to the ease of polymer solution preparation and the tendency of the polymer to remain in solution. N,N-dimethylformamide is known to form difficultly soluble gels when first dispersed in a solvent, and to minimize this effect the solvent and polymer are first cooled to about 0° C. and then mixed; the N,N-dimethylpropionamide, however, can be dispersed at room temperature with little or no gel formation. The use of N,N-dimethylpropionamide is favored by a greater resistance to hydrolysis than is the dimethylformamide of the prior art. The hydrolysis products, dimethylamine and propionic acid are known to promote gel formation and increase spinning difficulties.

Further details of the practice of this invention are set forth with respect to the following examples:

Example 1

One part of a terpolymer of 84 per cent of acrylonitrile, 11 per cent methacrylonitrile, five per cent of 2-vinylpyridine and nine parts of N,N-dimethylpropionamide were heated with stirring to 100° C. for 15 minutes. A clear, substantially colorless solution was obtained from which fibers and films could be prepared by precipitation in water or by drying.

Example 2

One part of a copolymer of 84 per cent of acrylonitrile and 16 per cent of methacrylonitrile and nine parts of N,N-dimethylpropionamide were heated with stirring to 140° C. for 15 minutes. A clear, colorless solution was obtained from which fibers and films could be readily prepared.

Example 3

A solution comprising one part of a copolymer of 90 per cent of acrylonitrile and ten per cent of vinylacetate and nine parts of N,N-dimethylpropionamide was prepared as in Example 2.

Example 4

A solution comprising one part of a terpolymer of 84 per cent of acrylonitrile, 11 per cent of methacrylonitrile, 5 per cent of 2-methyl-5-vinylpyridine and nine parts of N,N-dimethylpropionamide was prepared as in Example 2.

The invention is defined by the following claims.
What we claim is:

1. A fiber-spinning solution comprising from 70 parts to 95 parts by weight of N,N-dimethylpropionamide and from 30 to five parts of a ternary copolymer of from 80 per cent to 92 per cent of acrylonitrile, at least 2% of vinylpyridine, and up to 18 per cent of methacrylonitrile dissolved at a temperature between 50° C. and 150° C.

2. A fiber-spinning solution comprising from 70 parts to 90 parts by weight of N,N-dimethylpropionamide and from 30 to five parts of a ternary copolymer of monomeric substances of which from 80 per cent to 92 per cent of the total polymerizable monomer content is acrylonitrile, and at least two per cent is 2-methyl-5-vinylpyridine, and the remainder is another mono-olefinic monomer copolymerizable with acrylonitrile dissolved at a temperature between 50° C. and 150° C.

3. A fiber-spinning solution comprising from 70 parts to 95 parts by weight of N,N-dimethylpropionamide and from 30 to five parts of a ternary copolymer of from 80 per cent to 92 per cent of acrylonitrile, at least 2% of a compound containing an N-heterocyclic nucleus and a polymerizable olefinic radical on a side chain, and up to 18 per cent of another polymerizable olefinic monomer copolymerizable with acrylonitrile dissolved at a temperature between 50° C. and 150° C.

4. A fiber-spinning solution comprising from 70 parts to 95 parts by weight of N,N-dimethylpropionamide and from 30 to five parts of a ternary copolymer of from 80 per cent to 92 per cent of acrylonitrile, at least 2% of 2-methyl-5-vinylpyridine, and up to 18 per cent of methacrylonitrile dissolved at a temperature between 50° C. and 150° C.

5. A fiber-spinning composition which comprises a homogeneous miscible solution of N,N-dimethylpropionamide and a ternary copolymer of from 80% to 92% of acrylonitrile, at least 2% of vinylpyridine and of which up to 18% is comprised of other mono-olefinic monomers copolymerizable with acrylonitrile.

6. A fiber-spinning composition which comprises a homogeneous miscible solution of N,N-dimethylpropionamide and a ternary copolymer of from 80% to 92% of acrylonitrile, at least 2% of vinyl pyridine and up to 18% of methacrylonitrile.

7. A homogeneous miscible solution of N,N-dimethylpropionamide and a ternary copolymer of a monomeric substance of which from 80% to 92% of the total polymerizable monomer content is acrylonitrile, at at least 2% is a compound containing an N-heterocyclic nucleus and a polymerizable olefinic radical on a side chain, and of which up to 18% is comprised of other mono-olefinic monomers copolymerizable with acrylonitrile.

8. A homogeneous miscible solution of N,N-dimethylpropionamide and a ternary copolymer of from 80% to 92% of acrylonitrile, at least 2% of 2-methyl-5-vinylpyridine, and the remainder is another olefinic monomer copolymerizable with acrylonitrile.

9. A homogeneous miscible solution of N,N-dimethylpropionamide and a ternary copolymer of from 80% to 92% of acrylonitrile, at least 2% of 2-methyl-5-vinylpyridine, and up to 18% of methacrylonitrile.

References Cited in the file of this patent

UNITED STATES PATENTS

| Number | Name | Date |
|---|---|---|
| 2,503,245 | Coover et al. | Apr. 11, 1950 |
| 2,531,407 | D'Alelio | Nov. 28, 1950 |
| 2,583,327 | D'Alelio | Jan. 22, 1952 |